(12) United States Patent
Bala et al.

(10) Patent No.: US 10,719,927 B2
(45) Date of Patent: Jul. 21, 2020

(54) MULTIFRAME IMAGE PROCESSING USING SEMANTIC SALIENCY

(71) Applicant: Samsung Electronics Co., Ltd., Suwon-si (KR)

(72) Inventors: Raja Bala, Allen, TX (US); Hamid R. Sheikh, Allen, TX (US); John Glotzbach, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 255 days.

(21) Appl. No.: 15/862,492

(22) Filed: Jan. 4, 2018

(65) Prior Publication Data

US 2018/0189937 A1 Jul. 5, 2018

Related U.S. Application Data

(60) Provisional application No. 62/442,160, filed on Jan. 4, 2017.

(51) Int. Cl.
*G06T 5/50* (2006.01)
*G06T 7/33* (2017.01)

(52) U.S. Cl.
CPC ............... *G06T 5/50* (2013.01); *G06T 7/337* (2017.01); *G06T 2207/20221* (2013.01); *G06T 2207/30168* (2013.01)

(58) Field of Classification Search
CPC . G06T 5/50; G06T 7/337; G06T 2207/30168; G06T 2207/20221; G06T 2207/20024; G06T 2207/20182; G06T 2207/20212; G06T 2200/12; G06T 3/4053; G06T 3/4038; H04N 5/23229; H04N 5/23232; H04N 5/23258; H04N 5/23296; H04N 5/23212; H04N 5/23219; H04N 5/23218; H04N 5/23248; H04N 5/23254;
(Continued)

(56) References Cited

U.S. PATENT DOCUMENTS 7,623,683 B2 * 11/2009 Chen .................... G06T 5/50
375/240.16
8,068,693 B2 * 11/2011 Sorek ................. G06T 3/4038
358/450
(Continued)

FOREIGN PATENT DOCUMENTS

JP 2016032289 A 3/2016

OTHER PUBLICATIONS

Guanbin Li, et al., "Visual Saliency Detection Based on Muitiscale Deep CNN Features", CVPR 2015, 13 pages.
(Continued)

*Primary Examiner* — Michael S Osinski

(57) ABSTRACT

An electronic device, method, and computer readable medium for multi-frame image processing using semantic saliency are provided. The electronic device includes a camera, a display, and a processor. The processor is coupled to the camera and the display. The processor receives a plurality of frames captured by the camera during a capture event; identifies a salient region in each of the plurality of frames; determines a reference frame from the plurality of frames based on the identified salient regions; fuses non-reference frames with the determined reference frame into a completed image output.

20 Claims, 4 Drawing Sheets

(58) Field of Classification Search
CPC ........... H04N 5/23267; H04N 5/23277; H04N 5/235; H04N 5/2355; G06K 9/00765; G06K 9/46; G06K 9/00295; G06K 9/00744; G06K 9/036
See application file for complete search history.

(56) References Cited

U.S. PATENT DOCUMENTS

| | | | |
|---|---|---|---|
| 8,270,806 B2 | 9/2012 | Yashiro et al. | |
| 8,305,453 B2 | 11/2012 | Terauchi | |
| 8,750,645 B2 | 6/2014 | Joshi et al. | |
| 8,837,859 B2* | 9/2014 | Richards | G06T 5/005 382/284 |
| 9,014,467 B2* | 4/2015 | Hu | G06K 9/4671 382/164 |
| 9,344,619 B2* | 5/2016 | Shroff | H04N 5/2226 |
| 9,438,809 B2 | 9/2016 | Sheikh et al. | |
| 9,491,360 B2 | 11/2016 | Schulze et al. | |
| 9,619,708 B2* | 4/2017 | Hong | G06K 9/00624 |
| 10,121,067 B2* | 11/2018 | Kobayashi | G06K 9/00362 |
| 10,380,452 B1* | 8/2019 | Piovano | G06T 7/50 |
| 10,430,957 B2* | 10/2019 | Yoon | H04N 5/23229 |
| 2006/0093184 A1* | 5/2006 | Fukui | G06K 9/00234 382/103 |
| 2007/0237421 A1* | 10/2007 | Luo | G06T 11/60 382/284 |
| 2007/0242900 A1* | 10/2007 | Chen | G06T 5/50 382/294 |
| 2008/0069551 A1* | 3/2008 | Wakamatsu | G03B 17/00 396/55 |
| 2008/0304740 A1* | 12/2008 | Sun | G06K 9/3233 382/168 |
| 2008/0316327 A1* | 12/2008 | Steinberg | G06K 9/00248 348/222.1 |
| 2011/0142370 A1* | 6/2011 | Joshi | G06T 3/4038 382/307 |
| 2011/0268369 A1* | 11/2011 | Richards | G06T 5/005 382/284 |
| 2012/0188386 A1 | 7/2012 | Kulkarni et al. | |
| 2012/0256941 A1* | 10/2012 | Ballestad | G06K 9/00234 345/589 |
| 2012/0288189 A1* | 11/2012 | Hu | G06K 9/4671 382/164 |
| 2012/0300115 A1* | 11/2012 | Okada | H04N 5/23212 348/348 |
| 2014/0334681 A1* | 11/2014 | Kinoshita | H04N 5/23219 382/103 |
| 2015/0042840 A1* | 2/2015 | Komatsu | H04N 5/23229 348/222.1 |
| 2015/0055824 A1* | 2/2015 | Hong | G06K 9/00624 382/103 |
| 2015/0062384 A1* | 3/2015 | Tanaka | G06T 5/004 348/240.2 |
| 2015/0078654 A1 | 3/2015 | Chaudhury et al. | |
| 2015/0131898 A1* | 5/2015 | Schelten | G06T 5/003 382/159 |
| 2015/0221066 A1* | 8/2015 | Kobayashi | G06T 11/00 382/284 |
| 2015/0326798 A1* | 11/2015 | Muto | H04N 5/23229 348/239 |
| 2016/0028966 A1 | 1/2016 | Sheikh et al. | |
| 2016/0028967 A1* | 1/2016 | Sezer | H04N 5/2628 348/240.2 |
| 2016/0063343 A1* | 3/2016 | Loui | G06K 9/4604 382/195 |
| 2016/0080653 A1* | 3/2016 | Kim | G06T 5/002 348/216.1 |
| 2016/0267640 A1* | 9/2016 | Vivet | G06K 9/6203 |
| 2016/0267660 A1* | 9/2016 | Vivet | G06T 5/002 |
| 2017/0109912 A1* | 4/2017 | Lee | G06T 5/50 |
| 2017/0169574 A1* | 6/2017 | Xie | G06K 9/00771 |
| 2017/0270653 A1* | 9/2017 | Garnavi | G06T 7/0002 |
| 2018/0039821 A1* | 2/2018 | Gren | G06T 7/30 |
| 2018/0063414 A1* | 3/2018 | Hongu | G02B 7/34 |
| 2018/0075617 A1* | 3/2018 | Abe | G06T 5/003 |
| 2018/0198970 A1* | 7/2018 | Seshadrinathan | H04N 5/2355 |
| 2019/0244360 A1* | 8/2019 | Oniki | G06T 7/11 |

OTHER PUBLICATIONS

Kalin Ovtcharov, et al., "Accelerating Deep Convolutional Neural Networks Using Specialized Hardware", Microsoft Research Report, Feb. 22, 2015, 4 pages.

Frederick W. Wheeler, et al., "Multi-Frame Image Restoration for Face Recognition", Visualization and Computer Vision Lab, GE Global Research, 6 pages.

Shantanu H. Joshi, et al., "Image Resolution Enhancement and its Applications to Medical Image Processing", 18 pages.

* cited by examiner

MULTIFRAME IMAGE PROCESSING USING SEMANTIC SALIENCY

CROSS-REFERENCE TO RELATED APPLICATION AND CLAIM OF PRIORITY

This application claims priority under 35 U.S.C. § 119(e) to U.S. Provisional Patent Application No. 62/442,160 filed on Jan. 4, 2017, titled "MULTIFRAME IMAGE PROCESSING USING SEMANTIC SALIENCY."

TECHNICAL FIELD

This disclosure relates generally to systems for image processing. More specifically, this disclosure relates to systems and methods for multi-frame processing using semantic saliency.

BACKGROUND

Multi-frame image processing has been shown to significantly improve the quality of still images and video in a number of use cases, including zoom, low-light capture, and motion blur reduction. The multi-frame processing pipeline in the Hi-Fi Zoom (HFZ) feature found in Samsung Galaxy and Note smartphones comprises several steps, including pre-filtering, reference frame selection, registration, multi-frame fusion, and post-filtering. Parameters for these modules are tuned for best visual quality, and are designed to respond primarily to low-level image features obtained from edge and frequency analysis.

SUMMARY

In one embodiment, an electronic device provides for multi-frame image processing using semantic saliency. The electronic device includes a frame-based camera, an event-based camera, and a processor. The processor is coupled to the frame-based camera and the event-based camera. The processor receives a plurality of frames captured by the camera during a capture event; identifies a salient region in each of the plurality of frames; determines a reference frame from the plurality of frames based on the identified salient regions; fuses non-reference frames with the determined reference frame into a completed image output.

In a second embodiment, a method provides for multi-frame image processing using semantic saliency. The method includes receiving a plurality of frames captured by the camera during a capture event; identifying a salient region in each of the plurality of frames; determining a reference frame from the plurality of frames based on the identified salient regions; fusing non-reference frames with the determined reference frame into a completed image output.

In a third embodiment, a non-transitory medium embodying a computer program provides for multi-frame image processing using semantic saliency. The program code, when executed by at least one processor, causes a processor to receive a plurality of frames captured by the camera during a capture event; identify a salient region in each of the plurality of frames; determine a reference frame from the plurality of frames based on the identified salient regions; fuse non-reference frames with the determined reference frame into a completed image output.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

Figure 1:
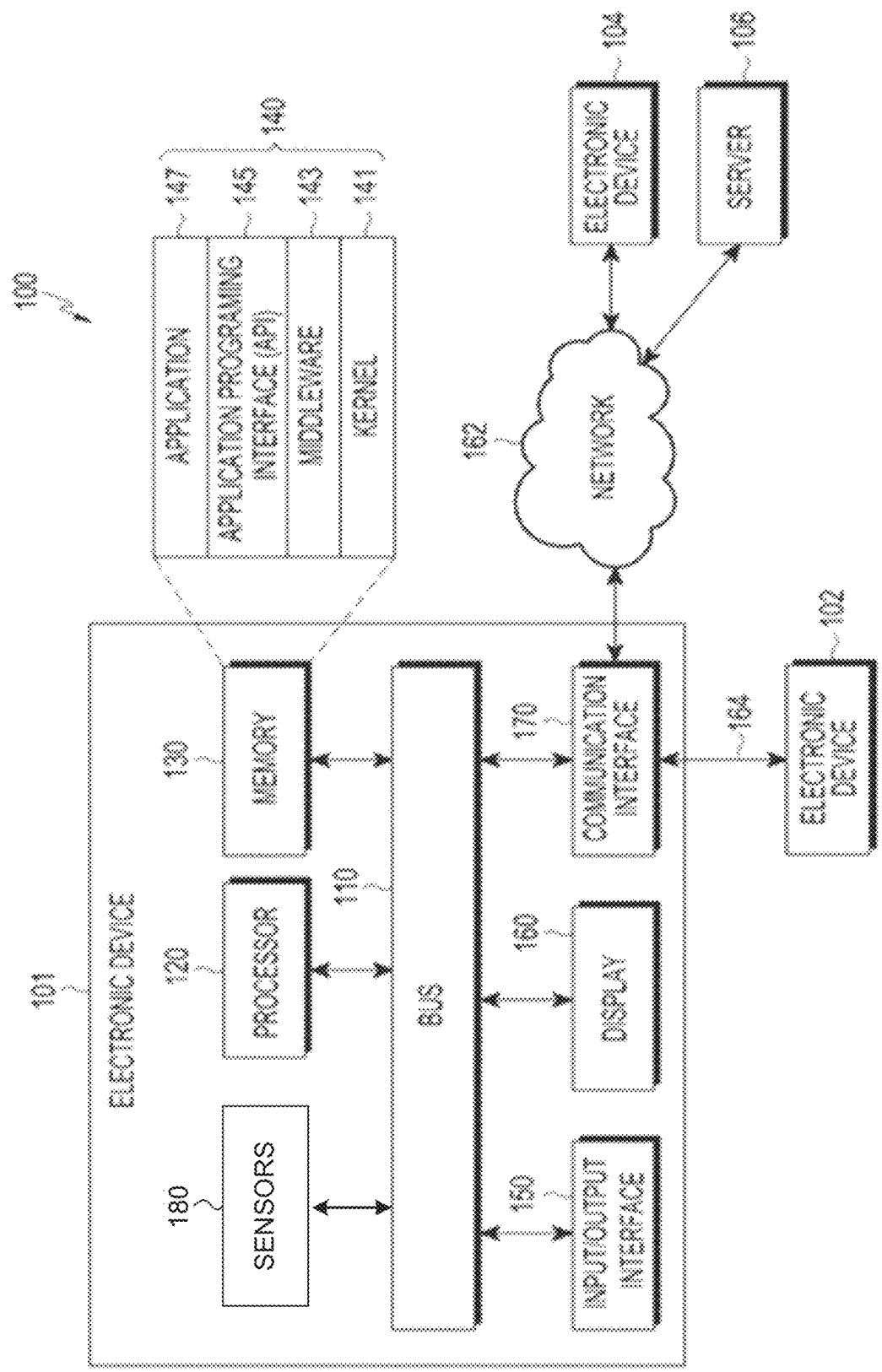
FIG. 1 illustrates an example network configuration according to embodiments of the present disclosure.

FIGS. 1 through 4, discussed below, and the various embodiments of the present disclosure are described with reference to the accompanying drawings. However, it should be appreciated that the present disclosure is not limited to the embodiments and all changes and/or equivalents or replacements thereto also belong to the scope of the present disclosure. The same or similar reference denotations may be used to refer to the same or similar elements throughout the specification and the drawings.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used herein, the terms "have," "may have," "include," or "may include" a feature (e.g., a number, function, operation, or a component such as a part) indicate the existence of the feature and do not exclude the existence of other features.

As used herein, the terms "A or B," "at least one of A and/or B," or "one or more of A and/or B" may include all possible combinations of A and B. For example, "A or B," "at least one of A and B," "at least one of A or B" may indicate all of (1) including at least one A, (2) including at least one B, or (3) including at least one A and at least one B.

As used herein, the terms "first" and "second" may modify various components regardless of importance and do not limit the components. These terms are only used to distinguish one component from another. For example, a first user device and a second user device may indicate different user devices from each other regardless of the order or importance of the devices. For example, a first component may be denoted a second component, and vice versa without departing from the scope of the present disclosure.

It will be understood that when an element (e.g., a first element) is referred to as being (operatively or communicatively) "coupled with/to," or "connected with/to" another element (e.g., a second element), it can be coupled or connected with/to the other element directly or via a third element. In contrast, it will be understood that when an element (e.g., a first element) is referred to as being "directly coupled with/to" or "directly connected with/to" another element (e.g., a second element), no other element (e.g., a third element) intervenes between the element and the other element.

As used herein, the terms "configured (or set) to" may be interchangeably used with the terms "suitable for," "having the capacity to," "designed to," "adapted to," "made to," or "capable of" depending on circumstances. The term "configured (or set) to" does not essentially mean "specifically designed in hardware to." Rather, the term "configured to" may mean that a device can perform an operation together with another device or parts.

For example, the term "processor configured (or set) to perform A, B, and C" may mean a generic-purpose processor (e.g., a CPU or application processor) that may perform the operations by executing one or more software programs stored in a memory device or a dedicated processor (e.g., an embedded processor) for performing the operations.

The terms as used herein are provided merely to describe some embodiments thereof, but not to limit the scope of other embodiments of the present disclosure. It is to be understood that the singular forms "a," "'an," and "the" include plural references unless the context clearly dictates otherwise. All terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the present disclosure.

For example, examples of the electronic device according to embodiments of the present disclosure may include at least one of a smartphone, a tablet personal computer (PC), a mobile phone, a video phone, an e-book reader, a desktop PC, a laptop computer, a netbook computer, a workstation, a PDA (personal digital assistant), a portable multimedia player (PMP), an MP3 player, a mobile medical device, a camera, or a wearable device (e.g., smart glasses, a head-mounted device (HMD), electronic clothes, an electronic bracelet, an electronic necklace, an electronic appcessory, an electronic tattoo, a smart mirror, or a smart watch).

Definitions for other certain words and phrases are provided throughout this patent document. Those of ordinary skill in the art should understand that in many if not most instances, such definitions apply to prior as well as future uses of such defined words and phrases.

According to embodiments of the present disclosure, the electronic device may be a smart home appliance. Examples of the smart home appliance may include at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, APPLE TV™, or GOOGLE TV™), a gaming console (XBOX™, PLAYSTATION™), an electronic dictionary, an electronic key, a camcorder, or an electronic picture frame.

According to an embodiment of the present disclosure, examples of the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, automatic teller's machines (ATMs), point of sales (POS) devices, or Internet of Things devices (e.g., a bulb, various sensors, an electric or gas meter, a sprinkler, a fire alarm, a thermostat, a street light, a toaster, fitness equipment, a hot water tank, a heater, or a boiler).

According to certain embodiments of the disclosure, the electronic device can be at least one of a part of a piece of furniture or building/structure, an electronic board, an electronic signature receiving device, a projector, or various measurement devices (e.g., devices for measuring water, electricity, gas, or electromagnetic waves).

According to embodiments of the present disclosure, the electronic device is one or a combination of the above-listed devices. According to embodiments of the present disclosure, the electronic device is a flexible electronic device. The electronic device disclosed herein is not limited to the above-listed devices, and can include new electronic devices depending on the development of technology.

Hereinafter, electronic devices are described with reference to the accompanying drawings, according to various embodiments of the present disclosure. As used herein, the term "user" may denote a human or another device (e.g., an artificial intelligent electronic device) using the electronic device.

FIG. 1 illustrates an example network configuration 100 according to various embodiments of the present disclosure. The embodiment of the network configuration 100 shown in FIG. 1 is for illustration only. Other embodiments of the network configuration 100 could be used without departing from the scope of this disclosure.

According to an embodiment of the present disclosure, an electronic device 101 is included in a network environment 100. The electronic device 101 may include at least one of a bus 110, a processor 120, a memory 130, an input/output (IO) interface 150, a display 160, a communication interface 170, or a sensors 180. In some embodiments, the electronic device 101 may exclude at least one of the components or may add another component.

The bus 110 includes a circuit for connecting the components 120 to 170 with one another and transferring communications (e.g., control messages and/or data) between the components.

The processor 120 includes one or more of a central processing unit (CPU), an application processor (AP), or a communication processor (CP). The processor 120 is able to perform control on at least one of the other components of the electronic device 101, and/or perform an operation or data processing relating to communication.

For example, the processor 120 can receive a plurality of frames captured by the camera during a capture event. The processor 120 can identify a salient region in each of the plurality of frames. The processor 120 can determine a reference frame from the plurality of frames based on the identified salient regions. The processor 120 can fuse non-reference frames with the determined reference frame into a completed frame. The processor 120 can operate the display to display the completed frame.

The memory 130 can include a volatile and/or non-volatile memory. For example, the memory 130 can store commands or data related to at least one other component of the electronic device 101. According to an embodiment of the present disclosure, the memory 130 can store software and/or a program 140. The program 140 includes, e.g., a kernel 141, middleware 143, an application programming interface (API) 145, and/or an application program (or "application") 147. At least a portion of the kernel 141, middleware 143, or API 145 may be denoted an operating system (OS).

For example, the kernel 141 can control or manage system resources (e.g., the bus 110, processor 120, or a memory 130) used to perform operations or functions implemented in other programs (e.g., the middleware 143, API 145, or application program 147). The kernel 141 provides an interface that allows the middleware 143, the API 145, or the application 147 to access the individual components of the electronic device 101 to control or manage the system resources.

The middleware 143 can function as a relay to allow the API 145 or the application 147 to communicate data with the kernel 141, for example. A plurality of applications 147 can be provided. The middleware 143 is able to control work requests received from the applications 147, e.g., by allocating the priority of using the system resources of the electronic device 101 (e.g., the bus 110, the processor 120, or the memory 130) to at least one of the plurality of applications 134.

The API 145 is an interface allowing the application 147 to control functions provided from the kernel 141 or the middleware 143. For example, the API 133 includes at least one interface or function (e.g., a command) for filing control, window control, image processing or text control.

The IO interface 150 serve as an interface that can, e.g., transfer commands or data input from a user or other external devices to other component(s) of the electronic device 101. Further, the IO interface 150 can output commands or data received from other component(s) of the electronic device 101 to the user or the other external device.

The display 160 includes, e.g., a liquid crystal display (LCD), a light emitting diode (LED) display, an organic light emitting diode (OLED) display, or a microelectromechanical systems (MEMS) display, or an electronic paper display. The display 160 is able to display, e.g., various contents (e.g., text, images, videos, icons, or symbols) to the user. The display 160 can include a touchscreen and may receive, e.g., a touch, gesture, proximity or hovering input using an electronic pen or a body portion of the user.

For example, the communication interface 170 is able to set up communication between the electronic device 101 and an external electronic device (e.g., a first electronic device 102, a second electronic device 104, or a server 106). For example, the communication interface 170 can be connected with the network 162 or 164 through wireless or wired communication to communicate with the external electronic device. The communication interface 170 can be a wired or wireless transceiver or any other component for transmitting and receiving signals, such as video feeds or video streams.

Electronic device 101 further includes one or more sensors 180 that can meter a physical quantity or detect an activation state of the electronic device 101 and convert metered or detected information into an electrical signal. For example, sensor 180 may include one or more buttons for touch input, a camera, a gesture sensor, a gyroscope or gyro sensor, an air pressure sensor, a magnetic sensor or magnetometer, an acceleration sensor or accelerometer, a grip sensor, a proximity sensor, a color sensor (e.g., a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an IR sensor, an ultrasound sensor, an iris sensor, a fingerprint sensor, etc. The sensor(s) 180 can further include a control circuit for controlling at least one of the sensors included therein. Any of these sensor(s) 180 may be located within the electronic device 101. A camera sensor 180 can capture a plurality of frames for a single image to be combined by the processor 120.

The first external electronic device 102 or the second external electronic device 104 may be a wearable device or an electronic device 101-mountable wearable device (e.g., a head mounted display (HMD)). When the electronic device 101 is mounted in a HMD (e.g., the electronic device 102), the electronic device 101 is able to detect the mounting in the HMD and operate in a virtual reality mode. When the electronic device 101 is mounted in the electronic device 102 (e.g., the HMD), the electronic device 101 can communicate with the electronic device 102 through the communication interface 170. The electronic device 101 can be directly connected with the electronic device 102 to communicate with the electronic device 102 without involving with a separate network.

The wireless communication is able to use at least one of, e.g., long term evolution (LTE), long term evolution-advanced (LTE-A), 5th generation wireless system (5G), mm-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include at least one of universal serial bus (USB), high definition multimedia interface (HDMI), recommended standard 232 (RS-232), or plain old telephone service (POTS).

The network 162 includes at least one of communication networks, e.g., a computer network (e.g., local area network (LAN) or wide area network (WAN)), Internet, or a telephone network.

The first and second external electronic devices 102 and 104 and server 106 each can be a device of the same or a different type from the electronic device 101. According to certain embodiments of the present disclosure, the server 106 includes a group of one or more servers. According to certain embodiments of the present disclosure, all or some of operations executed on the electronic device 101 can be executed on another or multiple other electronic devices (e.g., the electronic devices 102 and 104 or server 106). According to certain embodiments of the present disclosure, when the electronic device 101 should perform some function or service automatically or at a request, the electronic device 101, instead of executing the function or service on its own or additionally, can request another device (e.g., electronic devices 102 and 104 or server 106) to perform at least some functions associated therewith. The other electronic device (e.g., electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example.

Although FIG. 1 shows that the electronic device 101 includes the communication interface 170 to communicate with the external electronic device 104 or server 106 via the network 162, the electronic device 101 may be independently operated without a separate communication function, according to an embodiment of the present disclosure.

The server 106 can support to drive the electronic device 101 by performing at least one of operations (or functions) implemented on the electronic device 101. For example, the server 106 can include a processing module or processor that may support the processor 120 implemented in the electronic device 101.

Although FIG. 1 illustrates one example of a communication system 100, various changes may be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
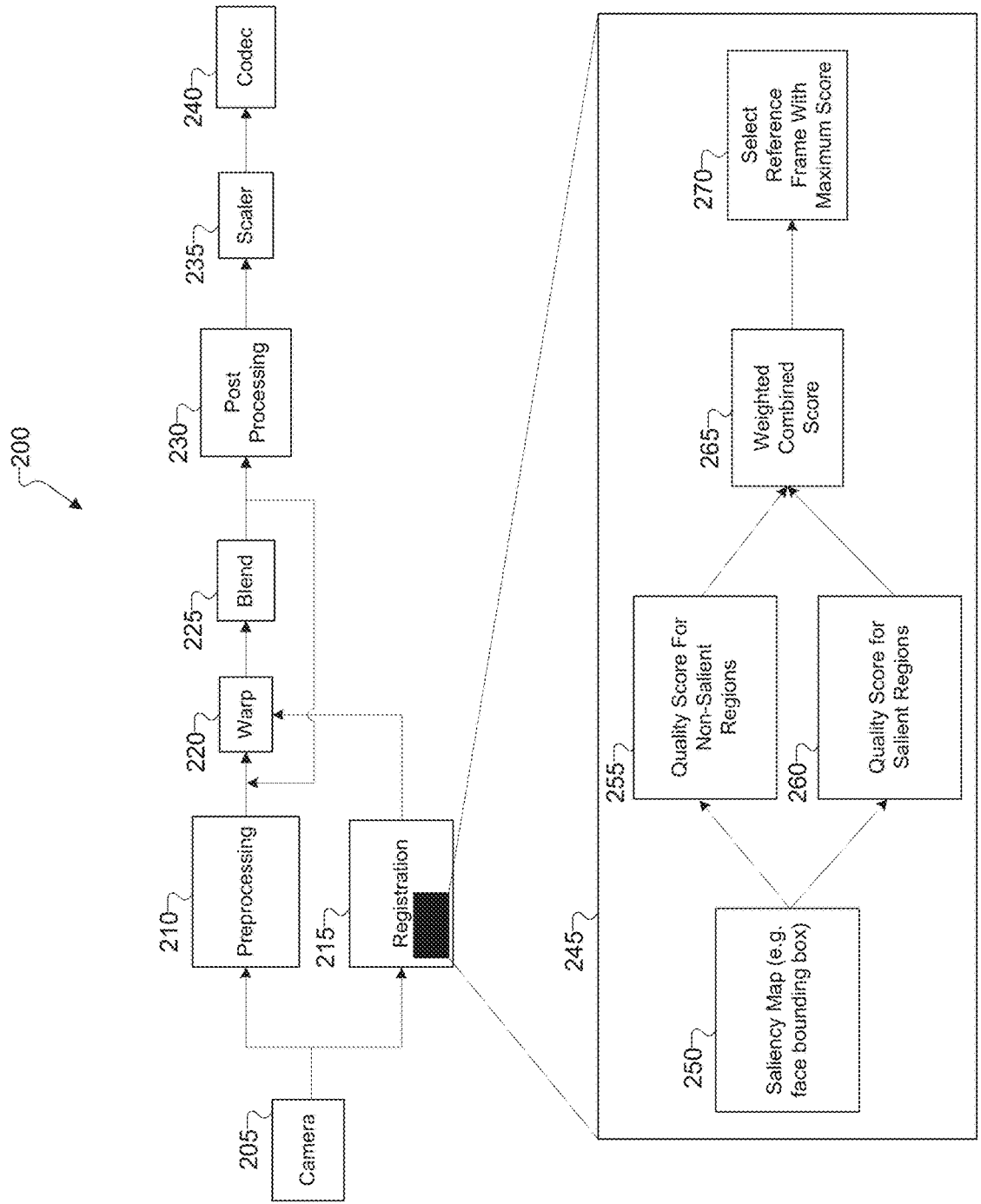
FIG. 2 is a block diagram illustrating a multi-frame processing pipeline according to embodiments of the present disclosure.

FIG. 2 is a block diagram illustrating a multi-frame processing pipeline 200 according to various embodiments of the present disclosure. The embodiment of the multi-frame processing pipeline 200 shown in FIG. 2 is for illustration only. Other embodiments of the multi-frame processing pipeline 200 could be used without departing from the scope of this disclosure.

Referring to FIG. 2, the multi-frame processing pipeline 200 includes receiving frames from a camera, preprocessing block 210, registration block 215, warp block 220, blend block 225, post-processing block 230, scaler block 235, and sending to a codec block 240. A plurality of frames are captured by a camera and sent to a processor for multi-frame processing in operation 205.

The pre-processing block 210 and post-processing block 230 are separate from the warp block 220 and blend block 225 that are implemented by the multi-frame processing module. The pre-processing block 210 and post-processing block 230 operate at the capture frame rate, yet the warp block 220 and the blend block 225 are implemented according to a rate that is N times the capture frame rate (also referred to as a normal frame rate), where N is a multi-frame factor identifying the number of frames in a sliding window.

The electronic device 101 performs preprocessing of the captured frames. The pre-processing block 210 could include a pre-scaler that upscales each frame in the sliding window by a second partial zoom ratio by applying the single-frame interpolation algorithm, wherein the user-selected zoom ratio equals a first partial zoom ratio multiplied by a second partial zoom ratio.

The electronic device 101 performs registration of the captured frames. The registration block 215 determines the best parameters that can map each non-reference frame within the sliding window geometrically onto the reference frame in the same sliding window. For example, the registration block 215 receives the frame feature information, which includes the list of points that match from each of the frames in the N-frame sliding window, and can identify a frame feature information list of points as the set of points where distortion is present. Some of the distortion present in the set of points is attributable to hand-shake camera motion, user intended camera motion, objects moving in the scene, or camera motion distortion such as complementary metal-oxide semiconductor (CMOS) Rolling Shutter Distortion. The registration block 215 can determine geometric warp parameters that can warp-align a frame onto the reference frame using frame feature information list. Using hand-shake variance information, the registration block 215 can modify the warp parameters to remove hand-shake. The registration block 215 can further modify the warp parameters so that the output is stabilized corresponding to the stabilized path. The registration block 215 can adjust warp parameters to remove CMOS rolling shutter distortion by generating distortion correcting geometric transformation parameters by utilizing motion distortion information. The registration block 215 can perform all or subset of these steps. The registration block 215 can use any mechanism for describing warp parameters, such as affine matrices, projective transform matrices, or even locally varying generic mesh-warp parameters. More of the registration block 215 is described below with the reference frame selection block 245.

The electronic device 101 performs warping of the captured frames. The warp block 220 compensates or otherwise corrects for geometric warp differences in each image. That is, for each image in the N-frame sliding window, the warp block 220 uses the affine matrices of the warp parameters associated with that image to generate an unwarped and upscaled version of that image. That is, the output from the warp block 220 is an interpolated version of the sliding window having N frames. The warp block 220 upscales the interpolated sliding window by a zoom ratio of approximately 1.5 times (1.5×) such that the interpolated sliding window has a larger number of pixels than the N-frame sliding window. The warp block 220 includes an aliasing-retaining interpolation filter that comprises a polyphase implementation of digital upscale with a cut-off low-pass filter that is designed to extend well beyond the typical Nyquist frequency, and passes through a significant portion of the first alias. The aliasing-retaining interpolation filter deliberately does not filter out the aliasing components when performing interpolation. The retention of aliasing can be partial or complete, but retaining aliasing in the interpolated sliding window until the blending process is intentional in filter design for the HiFi zoom. The aliasing retention of the warp block 220, which is objectionable in a single-frame interpolation algorithm from a quality perspective, helps retain image features and resolution when multiple frames are blended. Blending multiple frames cancels the alias while preserving image features. In certain embodiments, the warp block 220 can use any one of standard methods for interpolation, such as bilinear interpolation, bicubic interpolation, polyphase interpolation, or other such methods. In certain embodiments, the warp block 220 applies an image interpolation algorithm that includes at least one of: aliasing retaining (AR) interpolation, above AR interpolation as spatially varying weights, or implementing sharpening as part of the interpolation.

The electronic device 101 performs blending of the captured frames. The blend block 225 receives the interpolated sliding window and blends the N images into a single-blended image according to the adjusted blend control parameters. Though the blend block 225 can receive all N images of the interpolated sliding window, the blend block 225 may exclude an image from the blend process based on the adjusted blend control parameters. The location of a pixel in the first image of the interpolated sliding window is the same location of that pixel in the other images in the interpolated sliding window. Accordingly, each location of a pixel can be either: (1) a high quality pixel selected from a reference frame to be an unblended, or (2) a blend of up to N pixels from the same location in each of the N images in the interpolated sliding window. For each pixel location, the location motion maps indicate whether a pixel will be blended or not. For each of the images, the adjusted blend control parameters indicate which images will be used for the blend process and how much weight is assigned to pixels from each image. The single-blended image can include blended pixels at certain locations and unblended pixels at other locations. The blend block 225 uses a weighted averaging operation to perform the blending operation. The multi-frame blending operation performs aliasing cancellation, defect pixel correction, and signal to noise ratio improvement (noise filtering). The local motion maps include weights for the blending function that are determined by a local motion handling algorithm. The blend block 225 uses statistical estimation techniques such as mean, median or other statistic for the purpose of blending multiple images. For example, the blend block 225 can compute the statistical mean (or average) on-the-fly and use the mean as a computationally efficient statistic for blending. The blend block 225 is not limited to using the statistical average (for example, mean or median), but also can use a standard deviation, a minimum, or a maximum statistic as a computationally efficient statistic that can be computed on-the-fly, or any other statistic computed from the pixels coming from N frames.

The electronic device 101 performs post-processing of the captured frames. For example, the post-processing block 230 could implement a multi-frame post-processing algorithm such that the post-processing block 230 could be included in the multi-frame processing and operate at the rate that is N times the capture frame rate.

The electronic device 101 performs scaling on the captured frames. The scaler block 235 receives a sharpened version of the single-blended image. The scaler block 235 up-scales the sharpened single-blended image by a remainder zoom ratio using a single-frame interpolation algorithm, such as a bicubic method or other interpolation method. The output from the scaler block 235 is the completed frame at a resolution requested by the user, such as a nine-times (9×) or four-times (4×) resolution of digital zoom. For example, if a user zooms in to a nine-times zoom ratio to capture a video stream, then the warp block 220 applies a 1.5 times (1.5×) upscaling such that the sharpened single-blended image needs to be further up-scaled by a remainder six-times zoom ratio for a nine-times total zoom ratio. In this example, the total zoom ratio is divided by the first stage upscaling zoom ratio to equal the remainder zoom ratio. In certain embodiments, the scaler block 235 upscales each frame in the sliding window by the remainder zoom ratio (i.e., second partial zoom ratio) by applying a single-frame interpolation algorithm to the single-blended image, such that the completed frame is scaled to the user-selected zoom ratio (i.e., total zoom ratio). The electronic device 101 sends the scaled frames to the codec 240.

With the registration block 215, the electronic device 101 performs reference frame selection. The reference frame selection block 245 reduces latency of capturing a raw frame and outputting a composite frame by selecting a most clear frame to be the reference frame. In certain embodiments, the reference frame selection block 245 choose a frame from the plurality of frames as a reference using a criteria of saliency, in which case the frame with a highest combined sharpness score can be selected.

The reference frames selection block 245 includes determining a saliency map block 250 for each of the captured frames. Several different methods can be used to obtain salient region(s) from an image, including, as non-limiting examples, use of object detectors, use of the camera autofocus module, and use of a dedicated saliency module. An object detector is a face detector in a smartphone camera pipeline that can be leveraged to generate face regions, which are normally the most salient part of a scene. The camera autofocus module can determine which part of a scene to focus based on some measure of what is important in the scene. A dedicated saliency module can be used with convolutional neural networks (CNNs) to determine image saliency and to accelerate different hardware components.

In certain embodiments, the reference frame is selected by processing each frame through an edge filter, accumulating the filter output to generate a sharpness score, and selecting the frame with the highest score. When the scene contains faces, humans place greater importance to face sharpness when judging overall image quality. Hence it is beneficial to mimic this behavior when computing frame sharpness. In the new approach image sharpness within the face region(s) is given higher weight relative to non-face regions. A saliency map can be obtained in several ways including using object detectors, a camera autofocus module, or a dedicated saliency module.

The reference frames selection block 245 further includes determining an image quality score (such as a sharpness score) 255 for the non-salient regions. The non-salient image quality score 255 indicates the quality of the non-salient regions. While the non-salient regions are not as highly prioritized as the salient regions, the quality score provides important information on the remaining regions.

The reference frames selection block 245 further includes determining an image quality score (such as a sharpness score) block 260 for salient regions. The salient image quality score block 260 indicates the quality of the salient regions.

Different image quality metrics could be used to determine the quality of the salient regions, such as, but not limited to, sharpness, noise levels, color accuracy, color saturation, local over or under-exposedness, image artifact measure (such as blocking or ringing), or aesthetic image quality such as a person smiling, or photographically superior subject pose (such as facing towards the camera). In the rest of the detailed description section, sharpness score will be used as the example image quality score with which saliency is weighted, but it shall be understood that other image quality metrics mentioned in this paragraph may be used individually or in combination.

The reference frames selection block 245 further includes determining a weighted combined score block 265 for each of the frames. The salient regions are weighted heavier than non-salient regions to enhance the prioritized regions of the image. For example, the salient region could have double the weight of a non-salient region, even though the salient region is significantly smaller.

The reference frames selection block 245 further includes selecting a reference frame block 270 with a maximum weighted combined score. A highest salient score may not indicate a reference frame in certain embodiments. For example, two frames with similar salient sharpness scores could have significantly different non-salient sharpness score. If the difference in non-salient sharpness scores after being weighted is greater than the difference between the salient sharpness score after being weighted, the frame with a lower salient sharpness score could be selected as the reference frame.

Figure 3:
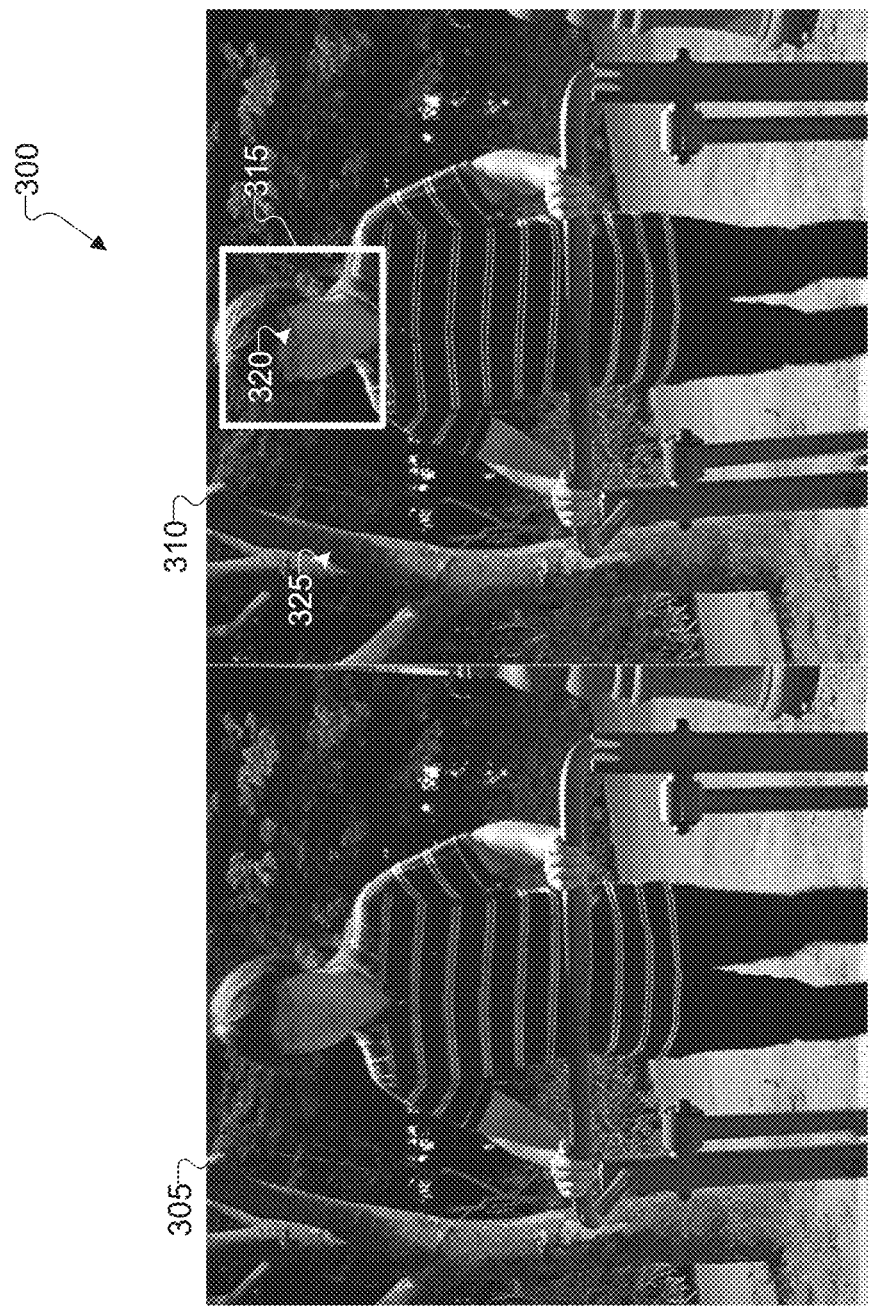
FIG. 3 illustrates an exemplary reference frame selection process results according to embodiments of the present disclosure.

FIG. 3 illustrates an exemplary embodiment of a reference frame selection process results 300 according to the various embodiments of the present disclosure. The embodiment of the reference frame selection process results 300 shown in FIG. 3 is for illustration only. Other embodiments of the reference frame selection process results 300 could be used without departing from the scope of this disclosure.

The example of the reference frame selection process results 300 include a reference image 305 selected with a general sharpness scoring and a reference image 310 selected using a saliency-weighted sharpness scoring. The reference image 310 includes a bounding box 315 separating a salient region 320 and a non-salient region 325. The bounding box may be included in a completed image, but is illustrated in FIG. 3 for reference. The salient region identifies the face of the person being captured, indicating that the face is prioritized when selecting the reference frame. The corresponding region in reference image 305 is blurry. The cause of the blurriness in the reference image 305 is due to the movement of the face in comparison to the background and other regions of the frame. Since the face occupies a relatively small portion of the overall frame, a general sharpness measure for image 305 is dominated by the sharpness of the non-face background 325 and results in a reference frame with a blurry face regions.

Output when reference frame selection is done using a global sharpness method versus a saliency sharpness method can be compared. When using the global sharpness method, the reference frame 305 had the highest overall sharpness, but contained a blurry face. When using the saliency sharpness method, the frame sharpness score was heavily weighted by face sharpness. Hence the frame with the sharpest face was selected as reference (possibly at the expense of increased blur in background regions) resulting in a sharper and clearer face in the resulting image 310. Saliency can be used for other operations in multi-frame processing, for example, image alignment and image fusion.

Figure 4:
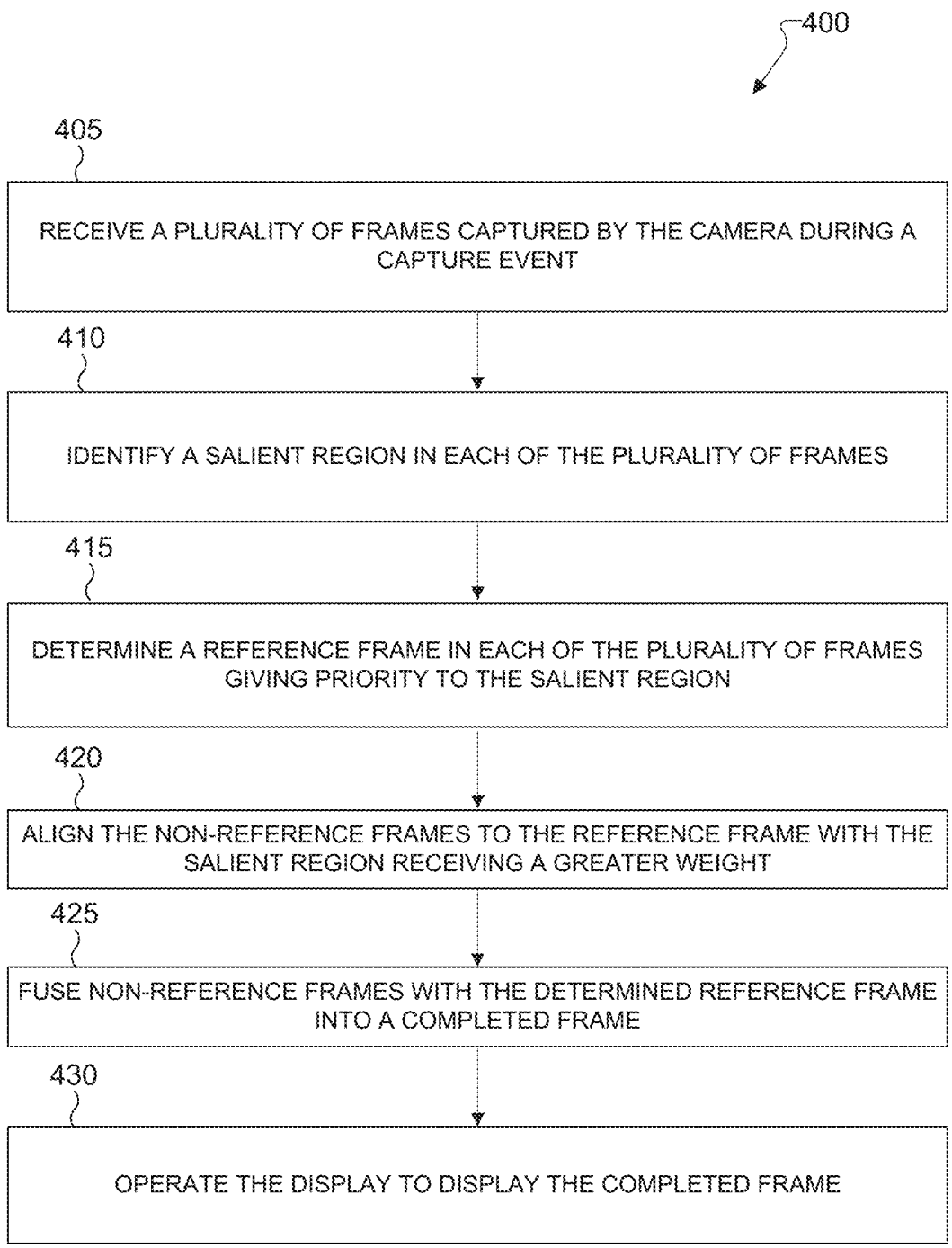
FIG. 4 illustrates an exemplary process flow diagram showing a method for multi-frame image processing using semantic saliency according to embodiments of the present disclosure.

FIG. 4 illustrates an exemplar flow diagram 400 for multi-frame image processing using semantic saliency according to the various embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in FIG. 6 can be performed by the electronic device 101 in FIG. 1.

In operation 405, the electronic device 101 receives a plurality of frames captured by the camera during a capture event. A capture event is an input that corresponds to the plurality of captured frames. For example, a capture event of a button press on a camera would cause the electronic device to capture a plurality of frames based on a target image. As discussed further below, the plurality of images are used to generate a single completed image that combines the plurality reducing noise.

In operation 410, the electronic device 101 identifies a salient region in each of the plurality of frames. The salient region can be a face region of a user obtained by a face detector, a human body detector, parts of a scene considered important based on a camera autofocus module, or parts of a scene considered important based on a camera autofocus module, or parts of a scene considered important based on deep learning based salient object detection methods, such as convolution neural networks (CNNs). The salient region is a region of the image that is prioritized above the remaining regions of the image. For example, a person in a picture would receive prioritization through the multi-frame processing over a background, even though the background is significantly larger in the image.

In operation 415, the electronic device 101 determines a reference frame in each of the plurality of frames. The reference frame is determined based on a locally varying image quality determination where a quality at the salient region is given greater weight than a quality at non-salient regions. The reference frame is a frame where the salient region or prioritized region has the greatest quality score over the other captured frames. The locally varying image quality determination is made by locally measuring a sharpness, noise levels, a color accuracy, a color saturation, an over or under-exposedness, image artifacts (e.g. blocking or ringing), or an aesthetic image quality (e.g. a person smiling or a photographically superior subject pose.

In operation 420, the electronic device 101 aligns the non-reference frames to the reference frame with the salient region receiving a greater weight. Aligning the non-reference frames to the reference frame includes placing more emphasis on accuracy of alignment in the salient region in comparison to non-salient regions when deriving an alignment transformation. The electronic device 101 identifies distinguishable features in the different images that can be compared and used to adjust any movements of the electronic device 101 through the capturing duration. The capturing duration is the time from the first captured frame to the last captured frame.

In operation 425, the electronic device 101 fuses non-reference frames with the determined reference frame into a completed frame. The completed frame is a frame that is clearer and crisper that any of the captures frames individually.

The electronic device blends the pixels from the salient region with non-salient region during the fusing of the non-reference frames with the determined reference frame. Blending the pixels from the salient region with the non-salient regions includes applying different criteria in blending within the salient region and non-salient regions.

In operation 430, the electronic device 101 operates the display to display the completed frame. The electronic device 101 also stores the completed frame in a memory.

Although FIG. 4 illustrates an example process, various changes could be made to FIG. 4. For example, while shown as a series of steps, various steps in each figure could overlap, occur in parallel, occur in a different order, or occur multiple times.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. An electronic device for multi-frame processing using semantic saliency comprising:
   a camera;
   a display; and
   a processor coupled to the camera and the display, the processor configured to:
      receive a plurality of frames captured by the camera during a capture event;
      identify a salient region in each of the plurality of frames;
      determine, for each of the plurality of frames, a first quality score for the salient region in the frame and a second quality score for one or more non-salient regions in the frame;
      determine a reference frame from the plurality of frames based on the first quality scores and the second quality scores; and
      fuse one or more non-reference frames from the plurality of frames with the determined reference frame into a completed image output.

2. The electronic device of claim 1, wherein, for each of the plurality of frames, the first quality score for the salient region in the frame is given greater weight than the second quality score for the one or more non-salient regions in the frame.

3. The electronic device of claim 2, wherein, for each of the plurality of frames, each of the first and second quality scores is determined by locally measuring a sharpness, a noise level, color accuracy, color saturation, over or under-exposedness, image artifacts, or an aesthetic image quality score.

4. The electronic device of claim 1, wherein, to fuse the one or more non-reference frames with the determined reference frame, the processor is configured to align the one or more non-reference frames to the reference frame with the salient regions in the frames receiving greater weight.

5. The electronic device of claim 4, wherein, to align the one or more non-reference frames to the reference frame, the processor is configured to place more emphasis on accuracy of alignment in the salient regions in the frames in comparison to the non-salient regions in the frames when deriving an alignment transformation.

6. The electronic device of claim 1, wherein the processor is further configured to:
   blend pixels within the salient regions in the frames and the non-salient regions in the frames during the fusing of the one or more non-reference frames with the determined reference frame.

7. The electronic device of claim 6, wherein, to blend the pixels within the salient regions in the frames and the non-salient regions in the frames, the processor is configured to apply different criteria in blending within the salient regions in the frames and within the non-salient regions in the frames.

8. The electronic device of claim 1, wherein, for each of the plurality of frames, the salient region in the frame is a human face, a human body, one or more parts of a scene considered important based on a camera autofocus module, or one or more parts of a scene considered important based on deep learning-based salient object detection.

9. A method for multi-frame processing using sematic saliency comprising:
   receiving a plurality of frames captured by a camera during a capture event;
   identifying, using a processor, a salient region in each of the plurality of frames;
   determining, for each of the plurality of frames using the processor, a first quality score for the salient region in the frame and a second quality score for one or more non-salient regions in the frame;
   determining, using the processor, a reference frame from the plurality of frames based on the first quality scores and the second quality scores; and
   fusing, using the processor, one or more non-reference frames from the plurality of frames with the determined reference frame into a completed image output.

10. The method of claim 9, wherein, for each of the plurality of frames, the first quality score for the salient region in the frame is given greater weight than the second quality score for the one or more non-salient regions in the frame.

11. The method of claim 9, wherein, for each of the plurality of frames, each of the first and second quality scores is determined by locally measuring a sharpness, a noise level, color accuracy, color saturation, over or under-exposedness, image artifacts, or an aesthetic image quality score.

12. The method of claim 9, wherein fusing the one or more non-reference frames with the determined reference frame comprises:
   aligning the one or more non-reference frames to the reference frame with the salient regions in the frames receiving greater weight.

13. The method of claim 12, wherein aligning the one or more non-reference frames to the reference frame comprises placing more emphasis on accuracy of alignment in the salient regions in the frames in comparison to the non-salient regions in the frames when deriving an alignment transformation.

14. The method of claim 9, further comprising:
   blending pixels within the salient regions in the frames and the non-salient regions in the frames during the fusing of the one or more non-reference frames with the determined reference frame.

15. The method of claim 14, wherein blending the pixels within the salient regions in the frames and the non-salient regions in the frames comprises applying different criteria in blending within the salient regions in the frames and within the non-salient regions in the frames.

16. The method of claim 9, wherein, for each of the plurality of frames, the salient region in the frame is a human face, a human body, one or more parts of a scene considered important based on a camera autofocus module, or one or more parts of a scene considered important based on deep learning-based salient object detection.

17. A non-transitory computer readable medium embodying a computer program, the computer program comprising computer readable program code that when executed causes at least one processor to:
receive a plurality of frames captured by a camera during a capture event;
identify a salient region in each of the plurality of frames;
determine, for each of the plurality of frames, a first quality score for the salient region in the frame and a second quality score for one or more non-salient regions in the frame;
determine a reference frame from the plurality of frames based on the first quality scores and the second quality scores; and
fuse one or more non-reference frames from the plurality of frames with the determined reference frame into a completed image output.

18. The non-transitory computer readable medium of claim 17, wherein, for each of the plurality of frames, the first quality score for the salient region in the frame is given greater weight than the second quality score for the one or more non-salient regions in the frame.

19. The non-transitory computer readable medium of claim 17, wherein, for each of the plurality of frames, each of the first and second quality scores is determined by locally measuring a sharpness, a noise level, color accuracy, color saturation, over or under-exposedness, image artifacts, or an aesthetic image quality score.

20. The non-transitory computer readable medium of claim 17, wherein the computer readable program code that when executed causes the at least one processor to fuse the one or more non-reference frames with the determined reference frame comprises:
computer readable program code that when executed causes the at least one processor to align the one or more non-reference frames to the reference frame with the salient regions in the frames receiving greater weight.

* * * * *